United States Patent Office.

LOUIS F. ROBERTSON, OF NEW YORK, N. Y.

Letters Patent No. 104,356, dated June 14, 1870; reissue No. 4,239, dated January 24, 1871.

IMPROVEMENT IN COMPOUNDS TO INCREASE THE FRICTION BETWEEN BELTS AND PULLEYS.

The Schedule referred to in these Letters Patent and making part of the same.

*To all whom it may concern:*

Be it known that I, LOUIS F. ROBERTSON, of the city, county, and State of New York, have invented a new and improved Compound to Increase the Friction between Belts and Pulleys; and I do hereby declare the following to be a full, clear, and exact description thereof, which will enable those skilled in the art to make and use the same.

This invention relates to a compound which is intended to be applied to pulleys for the purpose of increasing the adhesion of belts to the same, and which is made of volcan or mineral oil, beeswax, vegetable oil, and turpentine. These ingredients are mixed together in about the following proportions:

Volcan-oil, thirty-five parts; beeswax, ten parts; vegetable-oil, twenty parts; turpentine, thirty-five parts.

In order to mix these ingredients I take the volcan-oil, beeswax, and vegetable oil, (by preference rape-seed or cotton-seed oil,) and heat them together over a slow fire until the mass is melted, and then I add turpentine in about the above-given proportion, and stir the mixture well until all the ingredients are uniformly mixed. I then allow it to cool, when it is ready for use.

This compound is applied to the faces of pulleys over which a belt runs, and by its action the adhesion of the belt to its pulley is materially increased. The belt can therefore be run with a decreased tension without slipping, and by the decrease in the tension of the belt the friction in the bearings of the shaft is diminished and an increase of power is effected. The quantity of lubricating material used for oiling the shaft is reduced, and even if the pulleys over which the belt runs are not in the proper relative position toward each other, or if the face of a pulley is not correct, the belt will be enabled to run thereon without coming off.

The application of my compound to the faces of the pulleys must be repeated at intervals of from two to four weeks, or oftener if necessary.

What I claim as new, and desire to secure by Letters Patent, is—

A compound intended to increase the adhesion of belts to pulleys, and made of the ingredients herein specified, and mixed together substantially in the manner and about in the proportion set forth.

This specification signed by me this 7th day of January, 1871.

L. F. ROBERTSON.

Witnesses:
W. HAUFF,
E. F. KASTENHUBER.